June 6, 1972    H. LAMM    3,667,877
RADIAL SEAL FOR A ROTARY PISTON INTERNAL COMBUSTION ENGINE
Filed Oct. 24, 1969
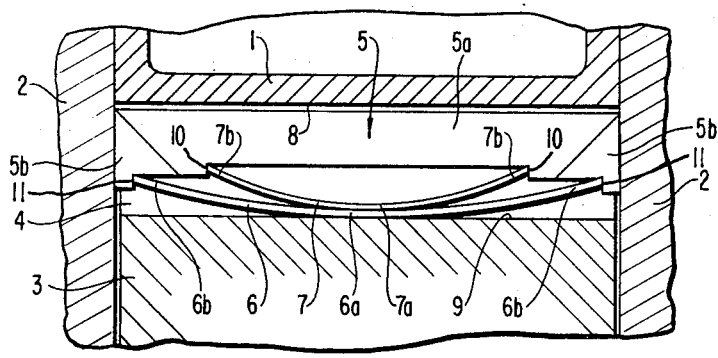
INVENTOR
HEINZ LAMM
BY
Craig, Antonelli, Stewart & Hill
ATTORNEYS 3,667,877
RADIAL SEAL FOR A ROTARY PISTON INTERNAL COMBUSTION ENGINE
Heinz Lamm, Esslingen-St. Bernhardt, Germany, assignor to Daimler-Benz Aktiengesellschaft, Stuttgart-Unterturkheim, Germany
Filed Oct. 24, 1969, Ser. No. 869,097
Claims priority, application Germany, Oct. 25, 1968, P 18 05 040.3
Int. Cl. F01c *19/02;* F03c *3/00;* F04c *27/00*
U.S. Cl. 418—121
2 Claims A radial seal for a rotary piston internal combustion engine in which a sealing bar, possibly constructed of several parts, is arranged in each groove provided in the piston corners; each sealing bar is urged in the radially outward direction by a spring means that consists of two leaf springs having different radii of curvature, with the leaf spring of larger radius of curvature abutting directly against the groove bottom while the leaf spring with smaller radius of curvature rests on the curved surface of the leaf spring with the larger radius of curvature.

The present invention relates to a radial seal for a rotary-piston internal combustion engine of especially trochoidal type of construction, which consists essentially of a sealing bar possibly of multi-partite construction that is arranged in an axially parallel groove in the piston and is pressed outwardly in the radial direction by springy means.

Springy means underneath a sealing bar have primarily the tasks to press the sealing bar outwardly in the radial direction in order to assure also with an absent gas-pressure, a sealing abutment of the sealing bar against the counter-surface. Therebeyond, the springy means also have the task to conduct the heat absorbed to a high degree by the sealing bar, to the relatively cool groove bottom in the piston.

The present invention is predicated on the aim to increase the heat conduction by way of the springy means and, insofar as multi-partite sealing bars are present, to improve the gas-tightness of such sealing bars by a favorable construction of the springy or elastic means.

The underlying problems are solved in accordance with the present invention in that the springy means consist of two leaf springs, each leaf spring is curved in a bow-like manner and abuts with the free ends against the sealing bar, and in that one leaf spring which has a larger radius of curvature is supported directly at the groove bottom whereas the other leaf spring which is provided with a smaller radius of curvature is supported at the curved surface of the first leaf spring.

One succeeds in an advantageous manner by the arrangement of two springs in accordance with the present invention to conduct larger heat quantities from the sealing bar to the groove bottom. Additionally, it is possible to accommodate larger spring forces in the same gas space underneath the sealing bar. A further advantage is also achieved during cold-starting. The gas-tightness is also assured with smallest starter rotational speeds and relatively thick oil. The drive unit thereby becomes more rapidly capable of ignition. It is additionally achieved that with a multipartite sealing bar, for example, with a sealing bar that consists of a center portion and of two side portions, one spring acts on the side portions and the other spring on the center portion. All sealing bar portions can adjust themselves relative to one another rapidly and easily. The sealing bar thereby becomes more gas-tight. Added thereto is the further fact that the center portion together with the one spring and the side portions of the sealing bar with the other spring form separate vibrational systems which mutually dampen one another by reason of the abutment of the springs one on the other.

Accordingly, it is an object of the present invention to provide a radial seal for a rotary-piston internal combustion engine which avoids by simple means the aforementioned shortcomings and drawbacks encountered in the prior art.

Another object of the present invention resides in a radial seal for a rotary-piston internal combustion engine which improves the gas-tightness of the sealing bars, even during cold-starting.

A further object of the present invention resides in a radial seal for rotary-piston internal combustion engines which permits the accommodation of larger spring forces underneath the sealing bar.

Still another object of the present invention resides in a radial seal for rotary-piston internal combustion engines in which all parts of a multi-partite sealing bar can adjust themselves relative to one another in an easy and rapid manner while the parts together with the associated springs form separate vibrational systems thereby mutually damping one another.

These and further objects, features and advantages of the present invention will become more obvious from the following description when taken in connection with the accompanying drawing which shows, for purposes of illustration only, one embodiment in accordance with the present invention, and wherein:

The single figure is a partial, somewhat schematic cross-sectional view through a rotary piston internal combustion engine provided with a radial seal in accordance with the present invention.

Referring now to the single figure of the drawing, the housing of a conventional rotary piston internal combustion engine consists in a conventional manner of the housig casing 1 and of the two side parts 2. The piston 3,, which is arranged in the housing in a conventional manner, is provided at its corners with grooves 4. A sealing bar generally designated by reference numeral 5, of which one sealing bar is arranged in each groove 4, consists of the center portion 5a and of the two lateral portions 5b adjoining the center portion along inclined surfaces. The sealing bar 5 is pressed outwardly in the radial direction against the running surface 8 of the piston 3 at the housing casing 1 by the gas forces, the centrifugal forces, and the two springs 6 and 7, whereby the springs 6 and 7 support themselves at the bottom 9 of the groove 4.

Each spring 7, 6 consists of a leaf spring curved in a bow-like manner. The spring 6 is provided with a larger radius of curvature and is supported with the curved surface 6a directly at the bottom 9 of the groove 4. The spring 6 abuts with its two ends 6b at the radial shoulders 11 of the lateral portions 5b of the sealing bar 5 and presses the same outwardly. The spring 7 is provided with a smaller radius of curvature and abuts with its curved surface 7a at the curved surface 6a of the spring 6. The two ends 7b of the spring 7 support the center portion 5a of the sealing bar 5 by engagement with the radial shoulders 10 of the center portion 5a.

While I have shown and described only one embodiment in accordance with the present invention, it is understood that the same is not limited thereto but is susceptible of numerous changes and modifications. For example, the springs 6 and 7 may also be arranged underneath a two-partite sealing bar which is constructed with only one independent lateral portion, or underneath a unitary sealing bar made in one piece. Thus, I do not wish to be limited to the details shown and described herein but intend to cover all such changes and modifications as are within the scope of those skilled in the art.

I claim:
1. A radial seal for rotary piston internal combustion engine which includes a sealing bar means arranged in a substantially axially-parallel groove in a piston and which is forced outwardly in a substantially radial direction by springy means, characterized in that the sealing bar means consists of a center part with a substantially radially directed shoulder near each end and of two lateral parts adjoining the center part by way of outwardly upwardly inclined complementary surfaces, each lateral part being provided with a substantially radially directed shoulder, and in that the springy means include two leaf springs, each leaf being curved in a bow-like manner to form exclusively a continuous concave configuration and abutting with the free ends at the sealing bar means, one of the leaf springs with a continuous concave configuration being provided with a larger radius of curvature and abutting directly against the groove bottom whereas the other leaf spring with a continuous concave configuration which is provided with a smaller radius of curvature is supported at the curved surface of the first mentioned leaf spring, and the leaf spring with the smaller radius of curvature spring-supporting the center part by engagement of its two ends at the substantially radially directed shoulders of the center part while the leaf spring with the larger radius of curvature supports the two lateral parts by engagement of its two ends at the substantially radially directed shoulders of the lateral parts.

2. A radial seal for a rotary piston internal combustion engine according to claim 1, characterized in that said spring means consists only of said first and second concavely curved leaf springs.

References Cited
UNITED STATES PATENTS

| | | | |
|---|---|---|---|
| 3,180,561 | 4/1965 | Paschke | 418—122 |
| 3,263,912 | 8/1966 | Frenzel | 418—122 |
| 3,300,124 | 1/1967 | Jones | 418—122 |

CARLTON R. CROYLE, Primary Examiner

J. J. VRABLIK, Assistant Examiner

U.S. Cl. X.R.

418—122